United States Patent Office 2,762,695
Patented Sept. 11, 1956

2,762,695
N-(CARBAMYL) AMIDE HERBICIDES

Henry J. Gerjovich, Wilmington, and Rayner S. Johnson, New Castle, Del., assignors to E. I. du Pont de Nemours and Company, Wilmington, Del., a corporation of Delaware No Drawing. Application December 22, 1954,
Serial No. 477,102

16 Claims. (Cl. 71—2.6)

This invention relates to a class of N-(carbamyl) amides and to herbicidal compositions and methods employing the compounds.

The N-(carbamyl) amides of the invention are characterized by the following basic structure (1)
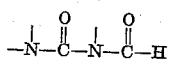

The compounds are further characterized by the groups that satisfy the free valences shown in Formula 1 above as will be pointed out in detail later. One of the nitrogen valences is satisfied, for example, by a phenyl or substituted phenyl radical, and at least one of the remaining valences is satisfied by a lower aliphatic hydrocarbon radical and any remaining valences is satisfied by hydrogen.

More specifically, the N-(carbamyl) amides of the invention are represented by the formula (2)
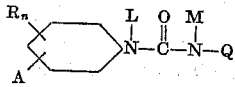

Where A and R are selected from the group consisting of hydrogen, halogen, and alkyl of less than 5 carbon atoms, $n$ is a positive integer less than 3 (i. e. 1 or 2), L, M, and Q are selected from the group of monovalent radicals consisting of hydrogen (—H), formyl

and aliphatic hydrocarbon of less than 5 carbon atoms, with the proviso that one and only one of L, M, and Q is formyl, and at least one but not more than two of L, M, and Q is an aliphatic hydrocarbon radical.

The preferred halogen substituent is chlorine. The preferred alkyl or aliphatic hydrocarbon radical substituent is methyl or ethyl, most preferably methyl.

The N-(carbamyl) amides of the invention are suitably prepared, for example, by reaction of an amide with an isocyanate as shown in Equations 3 and 4 below, or with a carbamyl halide as shown in Equation 5 or by the reaction of a carbamyl halide, obtained according to Equation 6a, with a sodium salt of an amide as shown in Equation 6b. While the equations below show the reaction of specific reagents to obtain specific compounds, it will be understood that these equations are for purposes of illustration only and that by suitable choice of the amide and the isocyanate or carbamyl halide reactant, the other N-(carbamyl) amides of the invention are similarly prepared.

(3)
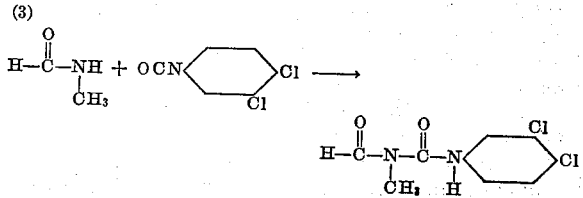

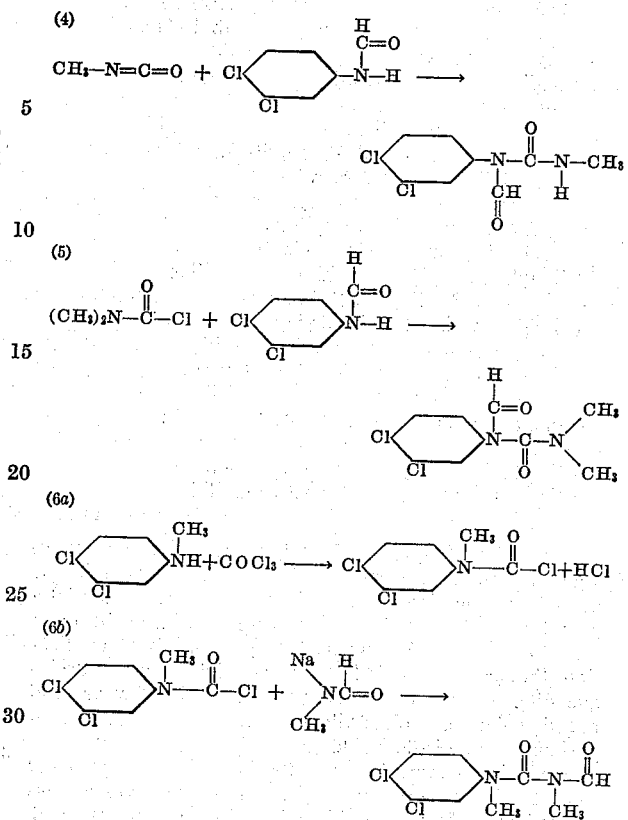

The reactions illustrated above are preferably carried out in an inert solvent such as xylene, toluene, or dioxane. The reaction is suitably carried out at a temperature in the range of about 15 to 75° C. No catalyst is needed but it is preferable to use an excess, say 10 to 20% molar excess of the amide. Processes of the kind illustrated by the foregoing equations are described in detail in examples given hereinafter of the preparation of illustrative specific compounds of the invention.

The N-(carbamyl) amides of the invention are generally white crystalline solids. They are insoluble in water and moderately soluble in hydrocarbon solvents at room temperature. Generally, they have sharp melting points with no indication of decomposition.

Illustrative of the compounds of the invention represented by Formula 2 above are:

N-(carbanilyl)-N-methylformamide
N-(p-chlorocarbanilyl)-N-methylformamide
N-(3,4-dichlorocarbanilyl)-N-methylformamide
N-(2,4,5-trichlorocarbanilyl)-N-methylformamide
N-(m-chlorocarbanilyl)-N-methylformamide
N-(p-bromocarbanilyl)-N-methylformamide
N-(o-chlorocarbanilyl)-N-methylformamide
N-(p-methylcarbanilyl)-N-methylformamide
N-(m-methylcarbanilyl)-N-methylformamide
N-(p-isopropylcarbanilyl)-N-methylformamide
N-(p-sec. butylcarbanilyl)-N-methylformamide
N-(3-chloro-4-methylcarbanilyl)-N-methylformamide
N-(3,4-dichlorocarbanilyl)-N-ethylformamide
N-(p-chlorocarbanilyl)-N-ethylformamide
N-(3,4-dichlorocarbanilyl)-N-isopropylformamide
N-(p-chlorocarbanilyl)-N-isopropylformamide
N-carbanilyl-N-isopropylformamide
N-(3,4-dichlorocarbanilyl)-N-butylformamide
N-(dimethylcarbamyl)-3,4-dichloroformanilide
N-(methylcarbamyl)-3,4-dichloroformanilide
N-(p-chloro-N-methylcarbanilyl)-N-methylformamide
N-(ethylcarbamyl)formanilide p-Chloro-N-(ethylcarbamyl)formanilide
N-(methylcarbamyl)formanilide
p-Chloro-N-(dimethylcarbamyl)formanilide
3-chloro-4-methyl-N-(methylcarbamyl)formanilide
N-(4-chloro-3-methylcarbanilyl)-N-methylformamide
3-methyl-N-(methylcarbamyl)formanilide
N-(3,4-dimethylcarbanilyl)-N-methylformamide
N-(dimethylcarbamyl)formanilide
N-(3,5-dimethylcarbanilyl)-N-methylformamide
N-(3,5-dimethylcarbanilyl)-N-ethylformamide
N-(carbanilyl)-N-butylformamide
N-(ethylcarbamyl)-3,4-dichloroformanilide
N-(p-chlorocarbanilyl)-N-allylformamide
N-(3,4-dichlorocarbanilyl)-N-vinylformamide
N-(diallylcarbamyl)-3,4-dichloroformanilide
N-(p-chlorocarbanilyl)-N-(2-butene-1-yl)formamide
N-(m-chlorocarbanilyl)-N-methallylformamide
N-(dimethylcarbamyl)-p-chloroformanilide
N-(diethylcarbamyl)-m-chloroformanilide
N-(N'-methylpropylcarbamyl)-formanilide
N-(dimethylcarbamyl)-p-tert.butylformanilide
N-(dimethylcarbamyl)-3-chloro-4-methylformanilide
N-(dimethylcarbamyl)-m-chloroformanilide
N-(dimethylcarbamyl)-p-fluoroformanilide
N-(3,4-dichlorocarbanilyl)-N-(2-butyne-1-yl)formamide The N-(carbamyl) amides of the invention have valuable herbicidal properties. They can, for example, be used in application to crop lands to give substantially complete control of the common weeds without harming the crop plants. At higher dosages or rates of application, they can be applied to railroad right-of-ways, drainage ditches, power transmission line right-of-ways, and the like where complete kill of plant growth for extended periods of time is desirable.

Herbicidal compositions of the invention are prepared by admixing one or more of the N-(carbamyl) amides defined heretofore, in herbicidally effective amounts, with a conditioning agent of the kind used and referred to in the art as a pest control adjuvant or modifier to provide formulations adapted for ready and efficient application to soil or weeds (i. e., unwanted plants), using conventional applicator equipment.

Thus the herbicidal compositions or formulations are prepared in the form of solids or liquids. Solid compositions are preferably in the form of dusts and are compounded to give homogeneous free-flowing dusts by admixing the active compound or compounds with finely divided solids preferably talcs, natural clays, pyrophyllite, diatomaceous earth or flours such as walnut shell, wheat, redwood, soya bean, cotton seed flours and other inert solid conditioning agents or carriers of the kind conventionally employed in preparing pest control compositions in dusts or powdered form.

Liquid compositions of the invention are prepared in the usual way by admixing one or more of the N-(carbamyl) amides with a suitable liquid diluent medium. With certain solvents such as alkylated naphthalene, dimethylformamide, and cresol, relatively high, up to about 35% by weight or more, concentrations of the N-(carbamyl) amide can be obtained in solution. Other liquids conventionally used in preparing liquid herbicidal compositions are for the most part less effective solvents.

The herbicidal compositions of the invention whether in the form of dusts or liquids preferably also include a surface-active agent of the kind sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene/carbon monoxide polymers, laurylamine hydrochloride, laurylpyridinium bromide, stearyl-trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

The herbicidal compositions are applied either as a spray or a dust to the locus or area to be protected from undesirable plant growth, commonly called weeds, i. e., plants growing where they are not wanted. Such application can be made directly upon the locus or area and the weeds thereon during the period of weed infestation in order to destroy the weeds, but preferably, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

In applying the herbicidal compositions of the invention for selective weed control as in the control of weeds in cotton or corn fields, the compositions are preferably applied after planting of the crop seeds but before emergence of the seedlings. In other words, the applications are of the pre-emergence type.

The active compound is, of course, applied in amount sufficient to exert the desired herbicidal action. The amount of the active compound present in the compositions as actually applied for destroying or preventing weeds will vary with the manner of application, the particular weeds for which control is sought, the purpose for which the application is being made, and like variables. In general, the herbicidal compositions as applied in the form of a spray or a dust will contain from about 0.5% to 85% of N-(carbamyl) amide.

Fertilizer materials, other herbicidal agents, and other pest control agents such as insecticides and fungicides can be included in the herbicidal compositions of the invention if desired.

In order that the invention may be better understood, the following examples are given in addition to the examples already given above. The examples illustrate a method for making the compound of the invention, herbicidal formulations employing the compound, herbicidal applications, and the results obtained. The numbers following tabulated ingredients in the examples represent parts by weight of the ingredients in the compositions.

EXAMPLE 1

A solution of 3,4-dichlorophenyl isocyanate in xylene was prepared by adding a solution of 48.6 parts by weight of 3,4-dichloroaniline in 200 parts of xylene to an agitated solution of 32 parts by weight of phosgene in 185 parts by weight of xylene and heating at reflux temperature until hydrogen chloride ceased to evolve from the reaction mass.

The 3,4-dichlorophenyl isocyanate solution thus obtained was cooled to room temperature and mixed with 18.6 parts by weight of N-methyl formamide. The resulting mixture was heated with stirring at reflux temperature for one hour. The hot solution was then treated with decolorizing carbon, filtered, and the filtrate allowed to cool. There was obtained by crystallization from the filtrate a total of 52.9 parts by weight of white crystalline N-(3,4-dichlorocarbanilyl)-N-methylformamide, M. P. 141–2° C.

Analysis.—Calc'd. for $C_9H_8Cl_2O_2$: Cl, 28.70; N, 11.33. Found: Cl, 28.4; N, 10.70.

EXAMPLE 2

6 parts by weight of N-methyl formamide, 15.5 parts by weight of p-chlorophenyl isocyanate and 150 parts by weight of toluene were mixed and heated at reflux temperature for 4 hours under anhydrous conditions. The toluene was removed under reduced pressure and the residue recrystallized from hexane. There was obtained in yield corresponding to 77% of the theoretical amount white crystalline N-(p-chlorocarbanilyl)-N-methylformamide, M. P. 98–100° C.

Analysis.—Calc'd. for $C_9H_9ClN_2O_2$; Cl, 16.70; N, 13.17. Found: Cl, 16.51; N, 13.09.

EXAMPLE 3

39.9 parts by weight of 3,4-dichloroformanilide, 10.4 parts by weight of methyl isocyanate and 150 parts by weight of benzene were mixed and heated to reflux temperature for 4 hours under anhydrous conditions. The benzene was removed under reduced pressure and the residue recrystallized from ethanol. There was obtained white crystalline N-(methylcarbamyl)-3,4-dichloroformanilide, M. P. 120–121° C.

Analysis.—Calc'd. for $C_9H_9Cl_2N_2O_2$: Cl, 28.70; N, 11.33. Found: Cl, 29.04; N, 11.53.

Additional examples of the herbicidally active compounds of the invention prepared according to the methods described heretofore are:

EXAMPLE 4

N - (3,5 - dimethylcarbanilyl) - N - methylformamide. M. P. 103–105° C.

Calc'd. for $C_{11}H_{14}N_2O_2$: N, 13.6. Found: N, 13.8.

The compound was prepared by the reaction of 3,5-dimethyl isocyanate with N-methylformamide.

EXAMPLE 5

N-(3,5-dimethylcarbanilyl)-N-ethylformamide, an oil. Calc'd. for $C_{12}H_{16}N_2O_2$: N, 13.7. Found: N, 13.4.

The compound was prepared by the reaction of 3,5-dimethyl phenyl isocyanate with N-ethylformamide.

EXAMPLE 6

N - (p - chlorocarbanilyl) - N-ethylformamide. M. P. 103–104° C.

Calc'd. for $C_{10}H_{11}ClN_2O_2$: N, 12.36; Cl, 15.67. Found: N, 12.34; Cl, 15.68.

This compound was prepared by the reaction of para-chlorophenyl isocyanate with N-ethylformamide.

EXAMPLE 7

N-(p-chlorocarbanilyl)-N-allylformamide. M. P. 62–63° C.

Calc'd. for $C_{11}H_{11}ClN_2O_2$: N, 11.74; Cl, 14.87. Found: N, 11.65; Cl, 14.73.

The compound was prepared by the reaction of para-chlorophenyl isocyanate with N-allyformamide.

EXAMPLE 8

N - (carbanilyl) - butylformamide. M. P. 65–66.5° C.

Calc'd. for $C_{12}H_{16}N_2O_2$: N, 11.0; Cl, 13.95. Found: N, 11.07; Cl, 13.97.

This compound was prepared by the reaction of phenyl isocyanate with N-butylformamide.

EXAMPLE 9

N-(3,4-dichlorocarbanilyl)-N-ethylformamide. M. P. 114–116° C.

Calc'd. for $C_{10}H_{10}Cl_2N_2O_2$: N, 10.73; Cl, 27.20. Found: N, 10.76; Cl, 26.99.

This compound was prepared by the reaction of 3,4-dichlorophenyl isocyanate with N-ethylformamide.

EXAMPLE 10

N-(carbanilyl)-N-methylformamide. M. P. 54–55° C. Calc'd. for $C_9H_{10}N_2O_2$: N, 15.73. Found: N, 15.77.

This compound was prepared by the reaction of phenyl isocyanate with N-methylformamide.

EXAMPLE 11

N-(o-chlorocarbanilyl)-N-methylformamide. M. P. 79.5–80.5° C.

Calc'd. for $C_9H_9ClN_2O_2$: N, 13.15; Cl, 16.65. Found: N, 13.31; Cl, 16.25.

This compound was prepared by the reaction of o-chlorophenyl isocyanate with N-methylformamide.

EXAMPLE 12

N-(m - chlorocarbanilyl)-N-methylformamide. M. P. 96–97° C.

Calc'd. for $C_9H_9ClN_2O_2$: N, 13.7; Cl, 16.7. Found: N, 13.56; Cl, 16.63.

This compound was prepared by the reaction of m-chlorophenyl isocyanate with N-methylformamide.

EXAMPLE 13

N-(m - methylcarbanilyl)-N-methylformamide. M. P. 69–70° C.

Calc'd. for $C_{10}H_{12}N_2O_2$: N, 14.58. Found: N, 14.58.

This compound was prepared by the reaction of m-methylphenyl isocyanate with N-methylformamide.

EXAMPLE 14

N-(3-chloro-4-methylcarbanilide)-N-methylformamide. M. P. 99.5–101.5° C.

Calc'd. for $C_{10}H_{11}ClN_2O_2$: N, 12.37; Cl, 15.67. Found: N, 12.28; Cl, 15.9.

This compound was prepared by the reaction of 3-chloro-4-methylphenyl isocyanate with N-methylformamide.

EXAMPLE 15

N-(methylcarbamyl)formanilide. M. P. 143° C. (d). Calc'd. for $C_9H_{10}N_2O_2$: N, 15.73. Found: N, 1578.

This product was prepared by the reaction of methyl isocyanate with formanilide.

EXAMPLE 16

N-(ethylcarbamyl)formanilide. M. P. 120.5–122.5° C.

Calc'd. for $C_{10}H_{12}N_2O_2$: N, 14.58. Found: N, 14.96.

This compound was obtained by the reaction of ethyl isocyanate with formanilide.

EXAMPLE 17

N-(ethylcarbamyl) - 3,4 - dichloroformanilide. M. P. 107.5–108.5° C.

Calc'd. for $C_{10}H_{10}Cl_2N_2O_2$: N, 10.73; Cl, 27.17. Found: N, 9.98; Cl, 27.88.

This compound was prepared by the reaction of ethyl isocyanate with 3,4-dichloroformanilide.

EXAMPLE 18

N-(dimethylcarbamyl)formanilide. B. P. 140–141° C. at 5 mm. Hg.

Calc'd. for $C_{10}H_{12}N_2O_2$: N, 14.58. Found: N, 14.50.

This compound was obtained by the reaction of formanilide, sodium salt, with dimethylcarbamyl chloride.

EXAMPLE 19

N-(dimethylcarbamyl) - 3,4 - dichloroformanilide. M. P. 83–84° C.

Calc'd. for $C_{10}H_{10}Cl_2N_2O_2$: N, 10.71; Cl, 27.19. Found: N, 10.12; Cl, 27.27.

This compound was obtained by the reaction of 3,4- dichloroformanilide, sodium salt, with dimethylcarbamyl chloride.

EXAMPLE 20

*Water-dispersible powders*

The following powdered compositions are adapted for dispersing in water for application as a spray for the destruction and prevention of weeds. The powdered compositions are made by intimately mixing the listed ingredients using conventional mixing or blending equipment and then grinding the mixture to give a powder having an average particle size less than about 50 microns.

A

| | |
|---|---|
| N-(3,4-dichlorocarbanilyl)-N-methylformamide | 75 |
| Fuller's earth | 23.75 |
| Sodium lauryl sulfate, 50% (wetting agent) | 1 |
| Methyl cellulose, 15 cps. (dispersing agent) | 0.25 |
| | 100 |

B

| | |
|---|---|
| N-(p-chlorocarbanilyl)-N-methylformamide | 80 |
| Sodium disulfonate of dibutyl phenylphenol (wetting and dispersing agent) | 2 |
| Bentonite | 18 |
| | 100 |

C

| | |
|---|---|
| N-(3,4-dichlorocarbanilyl)-N-isopropylformamide | 95 |
| Sulfonated petroleum oil (surface active dispersing agent) | 5 |
| | 100 |

EXAMPLE 21

*Dust formulations*

The following compositions are adapted for direct application as dusts for the destruction or prevention of weeds using conventional dusting equipment. The dusts are made by blending or mixing the ingredients and grinding the mix to give compositions having an average particle size less than about 50 microns.

A

| | |
|---|---|
| N-carbanilyl-N-methylformamide | 20 |
| Talc | 80 |
| | 100 |

B

| | |
|---|---|
| N-(3,4-dichlorocarbanilyl)-N-methylacetamide | 5 |
| Cottonseed oil | 4 |
| Walnut shell flour | 91 |
| | 100 |

EXAMPLE 22

*Oil-water dispersible powders*

The following powdered compositions are adapted for use in the preparation of spray compositions using either an oil, water, or a combination of oil and water as the liquid diluent. The powders are made by mixing and grinding as in the case of the powders of Example 21.

A

| | |
|---|---|
| N-(3,4-dichlorocarbanilyl)-N-methylformamide | 70 |
| Alkylated aryl polyether alcohol (wetting and dispersing agent) | 4 |
| Fuller's earth | 26 |
| | 100 |

B

| | |
|---|---|
| N-(p-chlorocarbanilyl)-N-ethylformamide | 80 |
| Ethylene oxide stearate-laurate (emulsifying agent) | 4 |
| Pyrophyllite | 16 |
| | 100 |

EXAMPLE 23

*Water-dispersible liquid compositions*

The following compositions are in a liquid form and are adapted for addition to water to give aqueous dispersions for application as sprays. The N-(carbamyl) amides are generally quite insoluble in most oils. Therefore, concentrated liquid compositions ordinarily are not complete solutions but rather are in part dispersions of solid in an oil. The liquid or fluid compositions shown are prepared by thoroughly mixing and dispersing the active compounds and conditioning agent or agents in an organic liquid diluent. The formulations shown below are solutions because the N-(carbamyl) amides employed are among the most soluble members of the class.

A

| | |
|---|---|
| N-(methylcarbamyl)-3,4-dichloroformanilide | 25 |
| Long chain fatty alcohol sulfate (emulsifying agent) | 2 |
| Goulac (dispersing agent) | 3 |
| Kerosene | 70 |
| | 100 |

B

| | |
|---|---|
| N-(dimethylcarbamyl)-p-chloroformanilide | 30 |
| Alkylated aryl polyether alcohol (wetting and emulsifying agent) | 3 |
| Methyl cellulose (dispersing agent) | 1 |
| Kerosene | 66 |
| | 100 |

EXAMPLE 24

*Granular compositions*

The following compositions are adapted for application by means of a fertilizer spreader apparatus or similar equipment. The compositions are readily prepared by mixing the ingredients with water to form a paste. The paste is then extruded, dried, and ground to give the desired granular size. Preferably, the granules will be in the order of one-thirty second to one-quarter inch diameter.

A

| | |
|---|---|
| N-(3,4-dichlorocarbanilyl)-N-methylformamide | 10 |
| Goulac (dispersing agent) | 3 |
| Hydrocarbon oil | 1 |
| Dextrin (binding agent) | 20 |
| Fuller's earth | 66 |
| | 100 |

B

| | |
|---|---|
| N-(3-chloro-4-methylcarbanilyl)-N-methylformamide | 7 |
| Goulac | 3 |
| Refined kerosene | 1 |
| Gelatin | 25 |
| Talc | 64 |
| | 100 |

EXAMPLE 25

A water-dispersible powder containing 80% by weight of N-(p-chlorocarbanilyl)-N-methylformamide was dispersed in water and applied as an aqueous spray to an area newly planted with cotton and corn seed, and heavily infested with weed seeds, both broad leaf and grasses.

Different dosages or rates of application were made on different areas.

Four weeks later, it was found that the aqueous pre-emergence treatments gave 88% control of weeds at a dosage of one pound of the N-(carbamyl)amide per acre, 98% control at a dosage of three pound per acre, and 100% control at six pounds per acre whereas an untreated check area had many weeds. Neither the corn or cotton plants were in any way injured by these treatments.

There follows a tabular form the results obtained with an illustrative number of compositions of the invention in pre-emergence treatments of the kind disclosed in Example 25. As in Example 25, the N-(carbamyl) amides were applied in a form of an aqueous dispersion of a water dispersible powder containing 80% by weight of the N-(carbamyl) amide to areas newly planted with cotton and corn seed and heavily infested with weed seeds of both the broad leaf and grass kinds. Observations and measurements were made four weeks after treatment, comparison being made with untreated check areas. The tabulated results show the amount of the N-(carbamyl) amide used to obtain at least 90% control of the weeds. In no case, were the corn or cotton plants injured by the treatments.

| Example Number | N-(carbamyl)amide | Dosage in lbs./acre to give 90% weed control |
|---|---|---|
| 26 | N-(p-chlorocarbanilyl)-N-allylformamide | 4.0 |
| 27 | N-(carbanilyl)-N-butylformamide | 3.0–4.0 |
| 28 | N-(o-chlorocarbanilyl)-N-methylformamide | 3.0 |
| 29 | N-(m-chlorocarbanilyl)-N-methylformamide | 0.5 |
| 30 | N-(3,4-dichlorocarbanilyl)-N-methylformamide | 1.0 |
| 31 | N-(m-methylcarbanilyl)-N-methylformamide | 1.0 |
| 32 | N-(methylcarbamyl) formanilide | 0.5–1.0 |
| 33 | N-(ethylcarbamyl) formanilide | 1.0 |
| 34 | N-(methylcarbamyl)-3,4-dichloroformanilide | 0.5–1.0 |
| 35 | N-(ethylcarbamyl)-3,4-dichloroformanilide | 4.0 |
| 36 | N-(dimethylcarbamyl) formanilide | 0.5–1.0 |
| 37 | N-(dimethylcarbamyl)-3,4-dichloroformanilide | 0.5–1.0 |

This application is a continuation-in-part of our co-pending application Serial No. 385,895, filed October 13, 1953, and now abandoned.

Those skilled in the art will appreciate that other N-(carbamyl) amides and other herbicidal compositions of the invention can be prepared and applied in accordance with the foregoing examples. Thus the foregoing detailed description has been given for clearness of understanding only and no unnecessary limitations are to be understood therefrom.

We claim:

1. An N-(carbamyl) amide represented by the formula

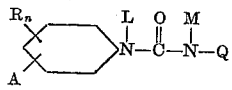

where A and R are selected from the group consisting of hydrogen, halogen, and alkyl of less than 5 carbon atoms, $n$ is a positive integer less than 3, L, M, and Q are selected from the group of monovalent radicals consisting of hydrogen, formyl, and aliphatic hydrocarbon of less than 5 carbon atoms, with the proviso that one and only one of L, M, and Q is formyl, and at least one but not more than two of L, M, and Q is an aliphatic hydrocarbon radical.

2. A herbicidal composition comprising a conditioning agent and in amount sufficient to exert herbicidal action, an N-(carbamyl) amide of claim 1.

3. A method for the prevention or destruction of weeds which comprises applying to a locus to be protected in amount sufficient to exert a herbicidal action, an N-(carbamyl) amide represented by the formula

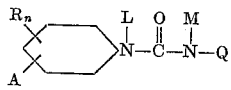

where A and R are selected from the group consisting of hydrogen, halogen, and alkyl of less than 5 carbon atoms, $n$ is a positive integer less than 3, L, M, and Q are selected from the group of monovalent radicals consisting of hydrogen, formyl, and aliphatic hydrocarbon of less than 5 carbon atoms, with the proviso that one and only one of L, M, and Q is formyl, and at least one but not more than two of L, M, and Q is an aliphatic hydrocarbon radical.

4. A herbicidal composition comprising a surface-active dispersing agent and, in amount sufficient to exert herbicidal action, an N-(carbamyl)amide of claim 1.

5. N-dimethylcarbamyl)-3,4-dichloroformanilide.
6. N-(dimethylcarbamyl)-p-chloroformanilide.
7. N-(m-chlorocarbanilyl)-N-methylformamide.
8. N-(p-chlorocarbanilyl)-N-methylformamide.

9. A herbicidal composition comprising a conditioning agent and, in amount sufficient to exert herbicidal action, N-(dimethylcarbamyl)-3,4-dichloroformanilide.

10. A herbicidal composition comprising a conditioning agent and, in amount sufficient to exert herbicidal action, N-(dimethylcarbamyl)-p-chloroformanilide.

11. A herbicidal composition comprising a conditioning agent and, in amount sufficient to exert herbicidal action, N-(m-chlorocarbanilyl)-N-methylformamide.

12. A herbicidal composition comprising a conditioning agent and, in amount sufficient to exert herbicidal action, N-(p-chlorocarbanilyl)-N-methylformamide.

13. A method for the prevention or destruction of weeds which comprises applying to a locus to be protected, in amount sufficient to exert a herbicidal action, N-(dimethyl-carbamyl)-3,4-dichloroformanilide.

14. A method for the prevention or destruction of weeds which comprises applying to a locus to be protected, in amount sufficient to exert a herbicidal action, N-(dimethylcarbamyl)-p-chloroformanilide.

15. A method for the prevention or destruction of weeds which comprises applying to a locus to be protected, in amount sufficient to exert a herbicidal action, N-(m-chlorocarbanilyl)-N-methylformamide.

16. A method for the prevention or destruction of weeds which comprises applying to a locus to be protected, in amount sufficient to exert a herbicidal action, N-(p-chlorocarbanilyl)-N-methylformamide.

References Cited in the file of this patent

Wiley: J. Amer. Chemical Society, vol. 71 (1949), pages 3746–3748.